United States Patent
Topolsek et al.

(10) Patent No.: US 7,429,064 B2
(45) Date of Patent: Sep. 30, 2008

(54) LIQUID TIGHT FITTING FOR CONDUIT

(75) Inventors: Hermann J. Topolsek, Fergus (CA); Howard W. Molto, Orangeville (CA)

(73) Assignee: MM Plastic (MFG.) Company, Inc., Ontario (CA)

( * ) Notice: Subject to any disclaimer, the term of this patent is extended or adjusted under 35 U.S.C. 154(b) by 0 days.

(21) Appl. No.: 11/121,036

(22) Filed: May 4, 2005

(65) Prior Publication Data
US 2006/0249952 A1   Nov. 9, 2006

(51) Int. Cl.
  *F16L 11/118* (2006.01)
(52) U.S. Cl. .................. 285/151.1; 285/150.1; 285/331
(58) Field of Classification Search ............... 285/154.1, 285/150.1, 139.1, 243, 307, 322, 331, 151.1
See application file for complete search history.

(56) References Cited

U.S. PATENT DOCUMENTS

| | | | | |
|---|---|---|---|---|
| 3,659,880 A | * | 5/1972 | Goldsobel | 285/243 |
| 4,652,018 A | * | 3/1987 | Boghosian | 285/149.1 |
| 4,685,706 A | * | 8/1987 | Kowal et al. | 285/322 |
| 5,072,072 A | * | 12/1991 | Bawa et al. | 285/243 |
| 5,204,499 A | * | 4/1993 | Favalora | 285/149.1 |
| 6,044,868 A | | 4/2000 | Gretz et al. | |
| 6,102,442 A | | 8/2000 | Gretz et al. | |
| 6,538,201 B1 | | 3/2003 | Gretz | |
| 6,619,194 B1 | | 9/2003 | Kuan | |
| 6,642,451 B1 | | 11/2003 | Gretz | |
| 6,767,032 B1 | | 7/2004 | Gretz | |
| 7,048,561 B1 | * | 5/2006 | Elbaz | 285/331 |

\* cited by examiner

*Primary Examiner*—Aaron Dunwoody
(74) *Attorney, Agent, or Firm*—Clark & Brody

(57) ABSTRACT

A connecting device for providing a liquid tight connection between a conduit and a panel includes a tubular body with a central flange having a forward face and a rearward face, a rear tubular section extending axially from the rearward face and a tubular nose section extending axially from the forward face. This body also has an annular cover section and an annular passageway be formed between the cover section and the rear tubular section. At least one thread is formed on the cover section and projects radially inwardly. A sealing ring is mounted in the passageway adjacent the rearward face and provides a seal between the tubular body and an end of the conduit. A forward fastening device secures the nose section to the panel.

15 Claims, 3 Drawing Sheets

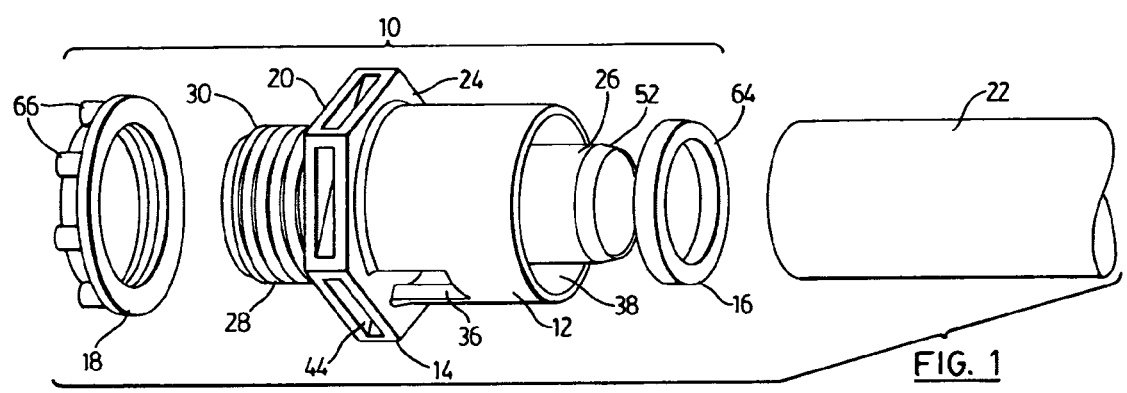
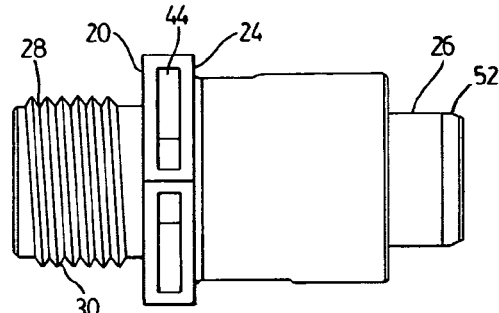
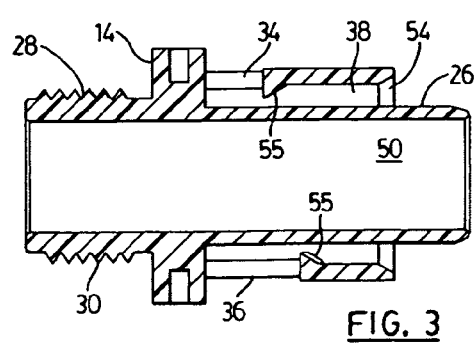

LIQUID TIGHT FITTING FOR CONDUIT

BACKGROUND OF THE INVENTION

This invention relates to connecting devices or fittings for providing a liquid tight connection for a conduit.

A variety of fittings, including liquid tight connectors, are known for connecting non-metallic or metallic conduit to panels or electrical boxes. Many of these connector fittings comprise several pieces that need to be disconnected from one another in order to fit the conduit into the connector and then re-attached in order to connect the conduit to the panel or box. Many of these fittings require the use of a tool to tighten a fastener such as a nut sufficiently to obtain a liquid tight connection. Also, these connectors often require that a nut be threaded onto the front end of the connector and tightened so as to obtain the required connection between the connector and the panel or box.

Recent U.S. Pat. No. 6,102,442 issued Aug. 15, 2000 to Arlington Industries, Inc. describes a water tight fitting for flexible conduit that comprises two pieces, one of which is a metallic tubular body having an integral collar formed thereon and extending radially outwardly. A rear section of the tubular body has external threads thereon for grabbing the interior surface of a flexible conduit and pulling it towards the collar. A forward end section of the tubular body also is threaded externally to provide an attachment mechanism for connecting the connector to a panel or junction box. The second piece of the connector is a non-metallic resilient seat member or ferrule that is friction fit onto the rearward end section of the tubular body.

U.S. Pat. No. 6,044,868 which issued Apr. 4, 2000 to Arlington Industries, Inc. describes another water tight fitting for flexible non-metallic conduit. This connector can be manufactured in a one piece molding operation. This connector has an inner body section with conduit threads extending about its outer circumference. A ferrule integral with the inner body section surrounds the inner body section and creates a circular channel into which the conduit can be inserted by a twisting action. A forward section of the connector is externally threaded and can be used to secure the connector to a panel by means of a separate lock nut.

It is an object of the present invention to provide an improved connecting device for providing a liquid type connection for a conduit, which connector can be made at a reasonable cost and is relatively easy to use.

It is a further object of the present invention to provide a connecting device for providing a liquid tight connection for a conduit which includes a tubular body having front and rear tubular sections and an annular cover section, a sealing mechanism for sealing a joint between the tubular body and the conduit, and a fastening mechanism for securing the tubular body to a support member.

SUMMARY OF THE INVENTION

According to one aspect of the invention, a connecting device for providing a liquid tight connection for a conduit includes a tubular body with a central flange having a forward face and a rearward face, a rear tubular section extending axially from the rearward face, a tubular nose section extending axially from the forward face, and an annular cover section. An annular passageway is formed between the rear tubular section and the cover section. At least one thread is formed on the cover section and projects radially inwardly into the passageway. A sealing ring adapted for mounting in the passageway externally of the rear tubular section and adjacent the rearward face is provided as well. This sealing ring is capable of sealing a joint formed between the tubular body and an end of the conduit during use of the connecting device. There is also a forward fastening device for securing the tubular nose section to a support member.

Preferably the rear tubular section is longer than and co-axial with the cover section.

According to another aspect of the invention, a connecting device for providing a liquid tight connection for a conduit includes a tubular body having front and rear tubular sections and an annular cover section extending over at least a portion of the rear tubular section. An annular passageway is formed between the rear tubular section and the cover section and is adapted to receive an end section of the conduit. At least one thread section is formed on the cover section and projects radially inwardly into the passageway. A sealing ring is also provided and is adapted for mounting in the passageway adjacent an inner front end thereof. The ring is capable of sealing a joint formed between the tubular body and an end of the conduit during use of the connecting device. The connecting device also has a forward fastening device for securing the front tubular section to a support member.

Preferably the tubular body is moulded as an integral one-piece body made of rigid, plastics material.

According to a further aspect of the invention, a connecting device for providing a liquid tight connection for a conduit includes a tubular body having front and rear tubular sections and a tubular outer section extending over at least a portion of the rear tubular section and spaced apart therefrom. The rear tubular section and the outer section are co-axial and form an annular passageway which is substantially closed at an inner end thereof and open at an outer end thereof and is adapted to receive an end section of the conduit. A ridge arrangement is formed on the outer section and projects radially inwardly into the passageway. The ridge arrangement forms at least one sharp edge for conduit threading purposes and comprises at least one spiral-shaped thread section. A sealing device is located in the passageway and adjacent the substantially closed inner end of the passageway. The sealing device is capable of sealing a joint between the tubular body and the conduit during use of the connecting device. The connecting device also has a forward fastening arrangement for securing the front tubular section to a panel.

Preferably the sealing device is a separate sealing ring made of elastomeric material.

Further features and advantages of the connecting device will become apparent from the following detailed description of a preferred embodiment, taken in conjunction with the accompanying drawings.

BRIEF DESCRIPTION OF DRAWINGS

FIG. 1 is an exploded view showing the components of a preferred connecting device constructed in accordance with the invention and an end section of a conduit;

FIG. 2 is a longitudinal side view of the tubular body of the connecting device of FIG. 1;

FIG. 3 is an axial cross-section of the tubular body taken along the line III-III of FIG. 6;

DETAILED DESCRIPTION OF PREFERRED EMBODIMENT

Figure 4:
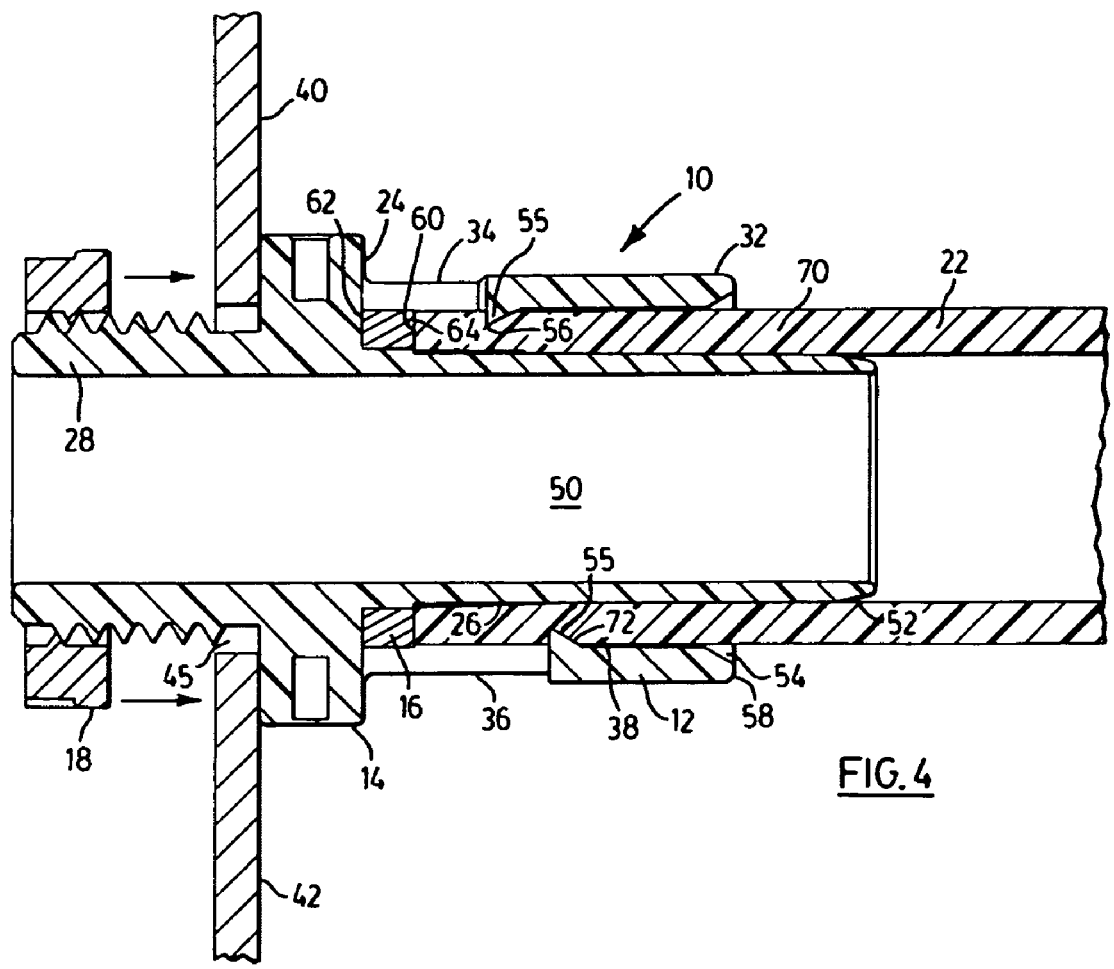
FIG. 4 is an axial cross-section of the connecting device including the tubular body, a sealing ring and a locking ring and illustrating how the connecting device is used to connect an end section of a conduit to a panel.
Figure 5:
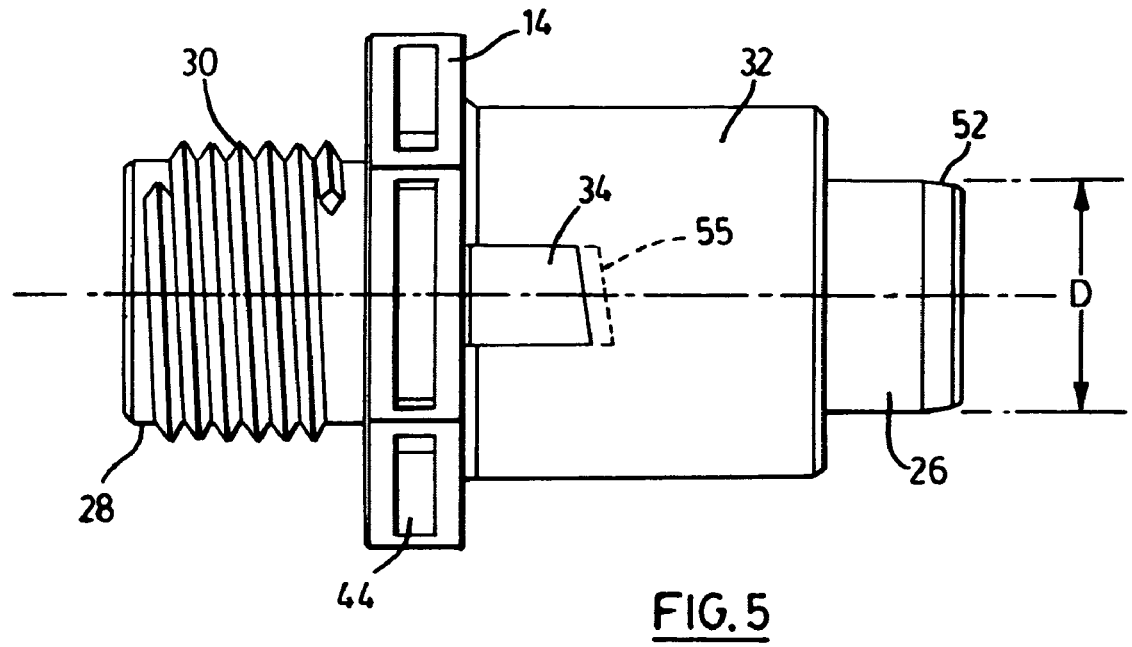
FIG. 5 is another longitudinal side view of the tubular member, this view being taken from above the tubular body as shown in FIGS. 2 and 3.

As shown in FIGS. 1 and 4 which illustrate a preferred embodiment of connecting device constructed in accordance with the invention, this connecting device 10 includes a tubular body 12 with a central flange or collar 14, a sealing ring 16 and a forward fastening device 18. The central flange has a forward face 20 which faces in the direction of the panel or support member to which a conduit 22 is to be connected and a rearward face 24, which faces towards the end section of the conduit to be attached. The preferred tubular body 12 includes a rear tubular section 26 which can have a smooth, cylindrical exterior and which extends axially from the rearward face 24, and a tubular nose section 28 extending axially from the forward face 20. Preferably the nose section 28 is externally threaded as shown to permit connection of the fastening device 18 which is preferably an internally threaded locking ring but could also be a suitable clip. The external threads of the nose section are indicated at 30 in FIGS. 1 to 3. The turbular body 12 further includes an annular cover section or ferrule 32 which can also have a smooth, cylindrical exterior except for two apertures or holes 34, 36 formed therein. An annular passageway 38 is formed between the rear tubular section 26 and the cover section.

Although the preferred tubular body 12 has a central flange 14 as shown, it is also possible to construct a connecting device in accordance with the invention without a connecting flange and to instead simply provide a suitable shoulder in the area where the rear tubular section meets the tubular nose section. Such a shoulder will provide means for engaging one surface 40 of a support member 42 which in many cases will take the form of a panel having one or more circular openings 45. The opening 45 has a sufficiently large diameter to permit passage of the nose section 28 but the hole 45 is sufficiently small that it will not permit passage of the central flange 14 or the aforementioned shoulder in the alternate embodiment. The preferred, illustrated central flange 14 is multi-sided and, as illustrated, the flange has six sides. These sides allow the tubular body to be turned about its longitudinal axis by means of a suitable tool such as a hand wrench. The illustrated flange has openings or slots 44 formed in each side but these are optional and the flange can be of solid construction, if desired. The advantage of the slots 44 is to reduce the weight of the connecting device and to save on material costs.

With respect to the rear tubular section 26, it will be noted that this section forms a cylindrical passageway 50 of uniform diameter, this passageway extending into the nose section 28 and indeed extending the entire length of the tubular body. Preferably the rear tubular section is longer than and co-axial with the cover section as shown. The longer length of the rear tubular section 26 helps with the guidance of the end section of the conduit into the annular passageway 38. Additional assistance for placement of the end section of the conduit over the tubular section 26 is provided by a slight end taper or chamfer at 52, that is at the outer end of the tubular section. The external diameter D of the rear tubular section 26 should correspond closely to the internal diameter of the conduit 22 for which the connecting device has been made but preferably the diameter D is slightly smaller.

With respect to the construction of the cover section 32, except for one, two or more threads or thread sections as described hereinafter, the interior surface of the cover section is substantially smooth and cylindrical, thus allowing the end section of the conduit 22 to be inserted into the annular passageway 38. In order to facilitate this insertion, the outer end of the cover section is preferably provided with a chamfer 54. The exterior surface of the cover section can be smooth and cylindrical except for the aforementioned apertures 34, 36.

Figure 6:
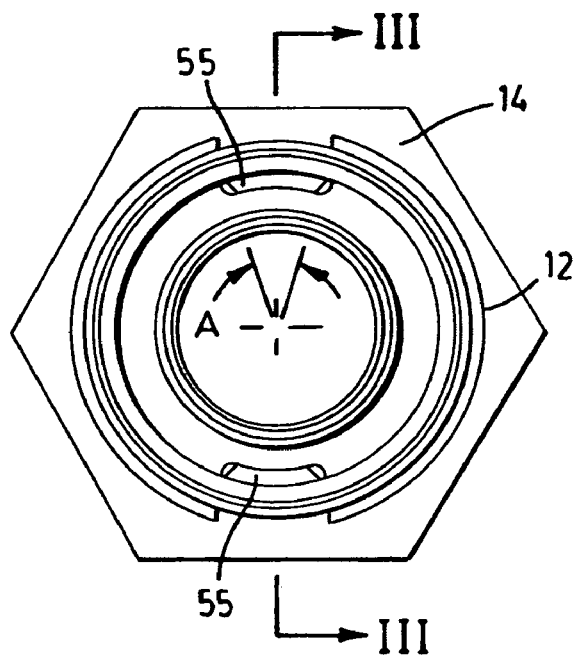
FIG. 6 is an end view of the tubular body, this view being taken from the right side of FIG. 2.

At least one thread 55 and preferably two threads 55 are formed on the cover section 32 and project radially inwardly into the passageway 38. Up to four threads 55 can be used on the tubular body 12. As used herein, the term "thread" refers to a projecting ridge that is preferably integrally formed on the cover section. Also, the term "thread" is intended to include a thread section, that is a thread that extends only through a circumferential arc and not entirely around the circumference of the cover section. In the preferred illustrated embodiment, the two threads 55 are formed on opposite sides of the cover section with each extending along one side of a respective one of the apertures 34, 36. The preferred illustrated threads extend circumferentially through an acute angle A of no more than 90°, more preferably no more than 45° (as can be seen in FIG. 6). Also, as illustrated, each thread section 55 extends circumferentially along a spiral path through an arc of about 45° or less. Thus, one end of each thread 55 is closer to the central flange 14 than the opposite end of the thread. In one preferred embodiment, the length of each thread runs between 0.025 and 0.050 inch.

A preferred cross-section of each thread 55 can be seen clearly from FIGS. 3 and 4. Thus, each thread 55 forms ridge means forming a sharp edge 56 for conduit threading purposes and the preferred ridge means is bevelled at at least its initial self-threading end. The two threads 55 are preferably not directly opposite one another but are staggered in the longitudinal direction as shown. Thus, the bottom thread 55 as seen in FIG. 4 is closer to the outer end 58 of the cover section than the top thread 55. It will be appreciated that as the end section of the conduit is inserted into the passageway 38, the end of the conduit will come into contact with the first of the threads 55 and then, by a twisting action, the conduit 22 can be threaded further into the passageway so that both threads will be engaged and eventually the end 60 of the conduit comes into contact with the sealing ring 16 as illustrated in FIG. 4. The threads 55 can be longer than the illustrated threads and there can be a single continuous thread 55 if desired, but preferably the threads extend through a spiral-shaped arc extending through an angle of no more than 90° as indicated above.

In the preferred embodiment of the present connecting device, the tubular body 12 is an integral, molded one-piece body made of a suitable plastics material, such as polyvinyl-chloride. When the tubular body 12 is made of plastics material, the present connecting device is only used to connect non-metallic conduit to a panel or junction box. The preferred tubular body can be made by an injection molding process and generally the tubular body is made from a rigid plastics material that is sufficiently durable and long lasting to be used as a connector for the intended purpose, for example, to connect an electrical conduit to a junction box or electrical panel. It is possible to construct the body 12 from a metal such as cast zinc alloy. If it is made of metal, the present connecting device can be used to connect both non-metallic conduit and metallic conduit to a panel or junction box.

The preferred sealing ring 16 is made of elastomeric material suitable for joint sealing purposes and, as shown in FIG. 4, it is mounted in the passageway 38 adjacent the rearward face of the flange 14. Thus, the sealing ring is mounted at the front end of the passageway and is capable of sealing a joint formed between the tubular body 12 and the end 60 of the conduit during use of the connecting device. The preferred illustrated sealing ring has flat, parallel front and rear surfaces 62 and 64. The internal diameter of the circular sealing ring corresponds substantially to the external diameter of the rear tubular section 26 while the external diameter of the ring corresponds closely to the internal diameter of the cover section 32. Of course, variations in the cross-section of the sealing ring are possible provided that when the end of the conduit is fully engaged against the sealing ring, a good, water-tight seal is formed. Preferred materials for the sealing ring include Santoprene™ (a registered trade-mark) and Kraton™ (a trade-mark) rubber.

A preferred form of the forward fastening device 18 is the illustrated locking ring which is internally threaded. Preferably the locking ring can be manually threaded onto the threads 30 and this is facilitated by external spaced-apart ridges 66 distributed about the circumference of the ring. The ring can be made either of a suitably strong, durable plastics material or of a suitable metal.

The apertures 34, 36 as shown each extend between one of the threads 55 and the rearward face of the central flange 14. The presence of these apertures helps in the insertion of the sealing ring 16 and the placement of this sealing ring against the rearward face of the flange. The holes can also facilitate the molding of the tubular body with the threads 55. The apertures extend axially inwardly from their respective thread section 55.

As shown in FIG. 4, the width of the passageway 38 between the rear tubular section and the cover section 32 in the preferred embodiment is approximately equal to or slightly greater than the thickness of the annular wall 70 forming the conduit 22. Because of this, twisting of the conduit into the passageway 38 during the connecting process will force the threads 55 to cut or press into and fully engage and hold the end section of the conduit.

It will be understood that the shape and pitch of the threads 55 is significant because, as the conduit is threaded onto the connector, they create a pulling or self-threading action on the conduit which can be made of metallic or non-metallic material. The angle of the preferred threads 55 on their rear face 72 is approximately 60° in relation to the radius of the cover section. The angles of the front and rear faces of the threads can range between 0 and 60 degrees in relation to the radius.

If the tubular body is fabricated from metal, this will provide electrical grounding that may be required when a metallic conduit is connected using the connector. Cast zinc alloy can be used and is well known in the electrical connector art.

In a particularly preferred embodiment, the outer diameter of the rear tubular section 26 is slightly less than the inner diameter of the conduit 22 and the inner diameter of the cover section 32 is slightly larger than the outer diameter of the conduit and this size relationship aids the entry of the conduit into the passageway 38.

Preferably, a round gasket (not shown) is placed over the nose section of the tubular body after it is inserted through the hole 45 in the panel and prior to connection of the lock nut 18. The use of such a gasket provides a water tight seal between the connector and the panel 40 when the lock nut is tightened.

To briefly explain the typical manner for using the connecting device 10 of the invention, the initial step is to cut the conduit 22 to the appropriate length for the job application. The end section of the conduit is then inserted into the passageway 38 and then the tubular body of the connector can be rotated relative to the adjacent end section of the conduit until the end 60 of the conduit is fully inserted within the passageway and sealingly presses against the sealing ring 16. The front nose section of the tubular body is then inserted through the hole 45 in the junction box or panel and then the connecting device can be secured in place by the use of the lock nut 18.

It will be apparent to those skilled in the art of conduit connectors that various modifications and changes can be made to the illustrated and described connecting device without departing from the spirit and scope of this invention. All such modifications and changes as fall within the scope of the appended claims are intended to be part of this invention.

We claim:

1. A connecting device for providing a liquid tight connection between a support having an aperture and a non-metallic conduit, said connecting device comprising:

a tubular body with an integral central flange having a forward face and a rearward face, a rear tubular section extending axially from said rearward face, a tubular nose section extending axially from said forward face, and an annular cover section, an annular passageway being formed between said rear tubular section and said cover section, at least one thread being formed in said cover section, projecting radially inwardly into said passageway, and extending circumferentially along a spiral path, at least one aperture being formed in said cover section and extending between said at least one thread and the rearward face of said central flange;

a sealing ring adapted for mounting in said passageway externally of said rear tubular section and adjacent said rearward face, said sealing ring being capable of sealing a joint formed between said tubular body and an end of said conduit during use of said connecting device; and a forward fastening device for securing said tubular nose section to a support member.

2. A connecting device according to claim 1 wherein said mar tubular section is longer than and coaxial with said cover section.

3. A connecting device according to claim 1 wherein said nose section is externally threaded and said forward fastening device is a lock nut that can be threaded onto said nose section.

4. A connecting device according to claim 3 wherein said sealing ring is made of elastomeric material and is mounted in said passageway adjacent said rearward face.

5. A connecting device according to claim 1 wherein the width of said passageway between said rear tubular section and said cover section is approximately equal to the thickness of an annular wall forming the conduit.

6. A connecting device for providing a liquid tight connection between a support having an aperture and a non-metallic conduit, said connecting device comprising:

a tubular body with an integral central flange having a forward face and a rearward face, a rear tubular section extending axially from said rearward face, a tubular nose section extending axially from said forward face, and an annular cover section, an annular passageway being formed between said rear tubular section and said cover section, two threads being formed in said cover section and on opposite sides of said cover section and projecting radially inwardly into said passageway, each of said threads extending circumferentially along a spiral path through an acute angle of no more than 90°;

a sealing ring adapted for mounting in said passageway externally of said rear tubular section and adjacent said rearward face, said sealing ring being capable of sealing a joint formed between said tubular body and an end of said conduit during use of said connecting device; and a forward fastening device for securing said tubular nose section to a support member.

7. A connecting device according to claim 4 wherein said central flange is multi-sided to allow said tubular body to be turned about its longitudinal axis by means of a suitable tool.

8. A connecting device according to claim 2 wherein said cover section has an annular rear end and an internal chamfer is formed on said rear end.

9. A connecting device according to claim 1 wherein said tubular body is an integral one-piece body molded from rigid, plastics material.

10. A connecting device for providing a liquid tight connection between a support having an aperture and a non-metallic conduit, said connecting device comprising:
  a tubular body having front and rear tubular sections and an annular cover section extending over at least a portion of the rear tubular section, an annular passageway being formed between the rear tubular section and said cover section and adapted to receive an end section of said conduit, two thread sections being formed on opposite sides of said cover section and projecting radially inwardly into said passageway, each thread section extending circumferentially along a spiral path through an arc of about 45° or less, said tubular body being molded as an integral one-piece body made of rigid, plastics material;
  a sealing ring adapted for mounting in said passageway adjacent an inner front end thereof, said ring being capable of sealing a joint formed between said tubular body and an end of said conduit during use of said connecting device; and
  a forward fastening device for securing the front tubular section to a support member,
  wherein said two thread sections are adapted for self threading of the conduit.

11. A connecting device according to claim 10 wherein said rear tubular section is longer than and coaxial with said cover section.

12. A connecting device according to claim 10 wherein there are two apertures formed in said cover section and each aperture extends axially inwardly from a respective one of the two thread sections.

13. A connecting device for providing a liquid tight connection between a support having an aperture and a non-metallic conduit, said connecting device comprising:
  a tubular body having front and rear tubular sections and a tubular outer section extending over at least a portion of the rear tubular section and spaced apart therefrom, said rear tubular section and said outer section being coaxial and forming an annular passageway which is substantially closed at an inner end thereof and open at an outer end thereof and is adapted to receive an end section of said conduit, ridge means being formed on said outer section and projecting radially inwardly into said passageway, said ridge means having two edges arranged for conduit self-threading purposes and comprising two spiral-shaped thread sections located on opposite sides of said outer section, each thread section extending through a spiral-shaped arc subtending an angle of less than 90°;
  a separate flat sealing ring made of elastomeric material located in said passageway and adjacent the substantial dosed inner end of said passageway, said sealing ring being capable of sealing a joint between said tubular body and an end of said conduit during use of said connecting device; and
  forward fastening means for securing said front tubular section to a panel.

14. A connecting device for connecting a support having an aperture and a non-metallic conduit having an outer diameter, said connecting device comprising:
  a tubular, integral one-piece body molded from rigid, plastics material, having an integral central flange with a forward face and a rearward face, a rear tubular section extending axially from said rearward face, a tubular nose section extending axially from said forward face and adapted for Insertion through said aperture, and an annular cover section having an inner diameter slightly lamer than the outer diameter of said conduit, an annular passageway being formed between said rear tubular section and said cover section and having an open outer end adapted to receive an end section of said conduit, two spiral shaped thread sections being formed on opposite sides of said cover section and projecting radially inwardly into said passageway, each thread section having an edge arranged for conduit self-threading purposes and extending circumferentially through an acute angle of no more than 90°, and
  a forward fastener for engaging said nose section in order to secure the connecting device to said support.

15. A connecting device according to claim 14 wherein said tubular nose section is externally threaded and said forward fastener is a lock nut that can be threaded onto said nose section.

* * * * *